(12) United States Patent
Presley et al.

(10) Patent No.: US 7,573,620 B2
(45) Date of Patent: Aug. 11, 2009

(54) GAMUTS AND GAMUT MAPPING

(75) Inventors: Anthony M Presley, Bellevue, WA (US); Jeffrey R Bloomfield, Redmond, WA (US); Michael D Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 652 days.

(21) Appl. No.: 11/218,195

(22) Filed: Sep. 1, 2005

(65) Prior Publication Data

US 2007/0046691 A1   Mar. 1, 2007

(51) Int. Cl.
G03F 3/08 (2006.01)
H04N 1/60 (2006.01)
H04N 1/46 (2006.01)
G06K 9/00 (2006.01)
G09G 5/02 (2006.01)

(52) U.S. Cl. .................. 358/518; 358/1.9; 358/504; 358/515; 382/162; 382/167; 345/589; 345/590; 345/603; 345/604

(58) Field of Classification Search ............. 358/1.9, 358/518, 515, 520, 521, 523, 3.24, 504; 345/590, 345/589, 603, 604; 382/162, 167
See application file for complete search history.

(56) References Cited

U.S. PATENT DOCUMENTS

| 5,107,332 A | 4/1992 | Chan |
| 5,185,673 A | 2/1993 | Sobol |
| 5,271,096 A | 12/1993 | Cook |
| 5,280,344 A | 1/1994 | Witlin et al. |
| 5,309,257 A * | 5/1994 | Bonino et al. ............... 358/504 |
| 5,313,291 A | 5/1994 | Appel et al. |
| 5,377,000 A | 12/1994 | Berends |
| 5,459,678 A | 10/1995 | Feasey |
| 5,483,339 A | 1/1996 | Van Aken et al. |
| 5,500,921 A * | 3/1996 | Ruetz ............... 358/1.9 |
| 5,537,516 A | 7/1996 | Sherman et al. |
| 5,583,666 A | 12/1996 | Ellson et al. |
| 5,701,175 A | 12/1997 | Kostizak et al. |
| 5,704,026 A * | 12/1997 | Wan ............... 345/590 |
| 5,757,536 A | 5/1998 | Ricco et al. |
| 5,809,164 A * | 9/1998 | Hultgren, III ............... 382/162 |
| 5,905,571 A | 5/1999 | Butler et al. |
| 5,999,319 A | 12/1999 | Castracane |
| 6,001,488 A | 12/1999 | Kataoka et al. |
| 6,023,557 A | 2/2000 | Shaklee |
| 6,157,735 A * | 12/2000 | Holub ............... 382/167 |
| 6,262,804 B1 | 7/2001 | Friend et al. |

(Continued)

FOREIGN PATENT DOCUMENTS

EP    0539943    5/1993

(Continued)

OTHER PUBLICATIONS

Corrigan, et al., "Silicon Light Machines—Grating Light Valve Technology Brief"; Jun. 2001 ver. C; 8 pages.
Daniels, "Eye-One Photo GretagMacbeth's Color Management For Professional Photographers," retrieved from the Internet on Nov. 22, 2005, http://www.shutterbug.com/test_reports/0304sb_eye/, Shutterbug, Mar. 2004, 5 pages.

(Continued)

*Primary Examiner*—Jonathan R Beckley
(74) *Attorney, Agent, or Firm*—Lee & Hayes, PLLC

(57) ABSTRACT

Techniques relating to gamuts and gamut mapping are described. In one instance, a process identifies a gamut attribute and generates a gamut having the attribute.

15 Claims, 7 Drawing Sheets

U.S. PATENT DOCUMENTS

| | | | |
|---|---|---|---|
| 6,297,826 B1* | 10/2001 | Semba et al. | 345/589 |
| 6,301,393 B1* | 10/2001 | Spaulding et al. | 382/240 |
| 6,340,975 B2* | 1/2002 | Marsden et al. | 345/590 |
| 6,373,595 B1* | 4/2002 | Semba et al. | 358/1.9 |
| 6,400,843 B1* | 6/2002 | Shu et al. | 382/167 |
| 6,411,304 B1* | 6/2002 | Semba et al. | 345/590 |
| 6,416,153 B1 | 7/2002 | Pan et al. | |
| 6,459,425 B1* | 10/2002 | Holub et al. | 345/207 |
| 6,525,721 B1 | 2/2003 | Thomas et al. | |
| 6,603,879 B2 | 8/2003 | Haikin et al. | |
| 6,611,356 B1* | 8/2003 | Shimizu et al. | 358/1.9 |
| 6,618,499 B1* | 9/2003 | Kohler et al. | 382/162 |
| 6,625,306 B1* | 9/2003 | Marshall et al. | 382/162 |
| 6,646,762 B1* | 11/2003 | Balasubramanian et al. | 358/1.9 |
| 6,681,041 B1 | 1/2004 | Stokes et al. | |
| 6,704,442 B2 | 3/2004 | Haikin et al. | |
| 6,754,384 B1* | 6/2004 | Spaulding et al. | 382/167 |
| 6,766,263 B1* | 7/2004 | Stokes | 702/88 |
| 6,775,028 B1* | 8/2004 | Reel | 358/1.9 |
| 6,775,633 B2 | 8/2004 | Edge | |
| 6,819,458 B1* | 11/2004 | Tanaka et al. | 358/518 |
| 6,833,937 B1* | 12/2004 | Cholewo | 358/518 |
| 6,836,345 B1 | 12/2004 | Setchell | |
| 6,859,551 B2* | 2/2005 | Ohga | 382/167 |
| 6,934,053 B1* | 8/2005 | Mestha et al. | 358/1.9 |
| 6,947,589 B2* | 9/2005 | Newman et al. | 382/162 |
| 6,954,287 B1* | 10/2005 | Balasubramanian et al. | 358/1.9 |
| 6,992,683 B2* | 1/2006 | Shin et al. | 345/589 |
| 7,035,460 B2* | 4/2006 | Gallagher et al. | 382/167 |
| 7,126,686 B2 | 10/2006 | Tsujita | |
| 7,134,737 B2* | 11/2006 | Vilanova et al. | 347/19 |
| 7,136,192 B2* | 11/2006 | Hussie | 358/1.9 |
| 7,158,146 B2* | 1/2007 | Ohga | 345/589 |
| 7,265,830 B2 | 9/2007 | Wang | |
| 7,391,475 B2* | 6/2008 | Pate et al. | 348/602 |
| 7,414,631 B2* | 8/2008 | Tin | 345/590 |
| 7,457,003 B1* | 11/2008 | Marcu et al. | 358/1.9 |
| 7,463,386 B2* | 12/2008 | Misumi | 358/1.9 |
| 2001/0015806 A1 | 8/2001 | Baker | |
| 2001/0038468 A1 | 11/2001 | Hiramatsu | |
| 2001/0045980 A1 | 11/2001 | Leonard | |
| 2002/0018121 A1 | 2/2002 | Fasciano | |
| 2002/0054384 A1 | 5/2002 | Motamed | |
| 2002/0105725 A1 | 8/2002 | Sweatt et al. | |
| 2002/0159065 A1 | 10/2002 | Berstis | |
| 2002/0169513 A1 | 11/2002 | Sherrill et al. | |
| 2003/0001860 A1* | 1/2003 | Yamazaki et al. | 345/590 |
| 2003/0016289 A1 | 1/2003 | Motomura | |
| 2003/0053134 A1 | 3/2003 | Haro | |
| 2003/0156283 A1 | 8/2003 | Jung et al. | |
| 2003/0202183 A1 | 10/2003 | Beimers et al. | |
| 2003/0234943 A1 | 12/2003 | Van Bael | |
| 2004/0190022 A1 | 9/2004 | Kiyohara | |
| 2004/0207862 A1 | 10/2004 | Such et al. | |
| 2004/0218072 A1 | 11/2004 | Zhang | |
| 2004/0245350 A1 | 12/2004 | Zeng | |
| 2005/0024379 A1 | 2/2005 | Marks | |
| 2005/0065440 A1 | 3/2005 | Levenson | |
| 2005/0073545 A1 | 4/2005 | Vilanova et al. | |
| 2005/0073685 A1 | 4/2005 | Arai | |
| 2005/0078122 A1 | 4/2005 | Ohga | |
| 2005/0078326 A1 | 4/2005 | Stokes et al. | |
| 2005/0094871 A1* | 5/2005 | Berns et al. | 382/162 |
| 2006/0197966 A1 | 9/2006 | Viturro et al. | |
| 2007/0002344 A1 | 1/2007 | Klassen | |
| 2007/0177141 A1 | 8/2007 | Ohishi et al. | |

FOREIGN PATENT DOCUMENTS

| | | |
|---|---|---|
| EP | 1489831 | 12/2004 |
| GB | 2381983 | 5/2003 |
| KR | 20000019374 A | 4/2000 |
| KR | 20040036116 A | 4/2004 |
| KR | 20040036790 A | 5/2004 |
| WO | WO9531794 | 11/1995 |
| WO | WO0042595 | 7/2000 |
| WO | WO0117233 | 3/2001 |
| WO | WO2004012442 | 2/2004 |
| WO | WO2004012461 | 2/2004 |
| WO | WO2007027745 | 3/2007 |

OTHER PUBLICATIONS

Diffractive MEMS; 4 pages.
EETimes.com—Diffractive optical MEMs using grating light valve technique; http://www.eetimes.com printed Jul. 18, 2005; 5 pages.
Drupa Product Review PT.1, Jun. 1, 2004; retrieved from the Internet Nov. 22, 2005: http://americanprinter.com/mag/printing_drupa_product_review/pp. 1-8.
Godil, "Diffractive MEMS technology offers a new platform for optical networks"; Laser Focus World May 2002. 3 pages.
Hardeberg, "Color Management: Principles and solutions". DeViceGuys/Conexant Systems Inc., Redmond, WA. USA pp. 1-5, (1999).
Starkweather; "Increasing Screen Size Valuing Productivity" Jun. 18, 2002; 31 pages.
King, Why Color Management? Adobe Systems Incorporated. pp. 1-7, Jun. 2001.
Knight, "Decreasing Download Time through Effective Color Management", Microsoft Interactive Developer (1996). pp. 1-10.
Lieberman, "Microsoft sets sights on future displays"; www.eet.com; printed Jul. 18, 2005; 5 pages.
Media For; Laser Focus World; http://laserfocusworld.printthis.clickability.com; printed Jul. 18, 2005.
Ostromoukhov, et al., "Two Approaches In Scanner-Printer Calibration: Colorimetric Space-Based vs. "Closed-Loop"," IS&T/SPIE 1994 Int'l Symposium on Electronic Imaging: Science & Technology, Feb. 6-Feb. 10, 1994, 10 pages.
Printing system offers multiple formats, Apr. 8, 2003; retrieved from the Internet Nov. 22, 2005, http://news.thomasnet.com/fullstory/21137/447, pp. 1-6.
Riesenberg, et al., "Optical MEMS for High-End Micro-Spectrometers"; SPIE vol. 4928; 9 pages, Aug. 31, 2005.
Rosen, et al., "Color Management within a Spectral Image Visualization Tool," retrieved from the Internet Nov. 22, 2005, http://www.cis.rit.edu/people/faculty/fairchild/PDFs/PRO10.pdf, 7 pages.
"Windows Color Management: Background and Resources." Dec. 4, 2001, pp. 1-10.
www.xrite.com/documents/literature/en/L11-044_DTP41_en.pdf; Unsurpassed Accuracy; DTP41 SeriesII AutoScan Spectrophotometer, Jul. 2006.
XYZ Observer Model 5B, retrieved from the Internet Nov. 22, 2005, http://www.spectralmasters.com/XYZ%20Observer.html, 2 pages.
Yokoyama, et al., "A New Color Management System Based on Human Perception and its Application to Recording and Reproduction of Art Paintings", retrieved from the Internet Nov. 22, 2005, www.mi.tj.chiba-u.jp/~tsumura/Tsumura/papers/CIC5_yokoyama.pdf, The Fifth Color Imaging Conference: Color Science, Systems, and Applications, pp. 169-172.
PCT Search Report for PCT Application No. PCT/US2006/033822, mailed Jan. 9, 2007 (2 pages).
Microsoft Corporation, "Windows Color System in Windows Longhorn," updated: Apr. 25, 2005, retrieved from the internet on Sep. 1, 2005: http://www.microsoft.com/whdc/device/display/color/WCS.mspx, 2 pages.
Li, C.J. et al., "Testing the robustness of CIECAM02," Wiley InterScience: Journal: Abstract, retrieved from the internet on Sep. 1, 2005: http://www3.interscience.wiley.com/cgi-bin/abstract/109882891/Abstract, 2 pages.
Vasa, Libor, "5.2 Robustness testing—Diploma Thesis—Resolution improvement of digitized images," University of West Bohemia in Pilsen, Dept. of Computer Science & Engineering, 2004, pp. 1-72.

* cited by examiner

GAMUTS AND GAMUT MAPPING

BACKGROUND

Devices involved in generating images have a gamut or a total range of colors which a particular device can reproduce. For purposes of explanation, a gamut may be thought of as a sub-set of the colors visible to a human, which the device can reproduce. Many user scenarios involve sending an image from one device to another device. For instance, an image may be generated on a display device, such as a monitor, and a user may want to send the image to a second device, such as a printer, to produce a hard-copy of the image. Generally the two devices will have different gamuts and gamut mapping is utilized to map image data from the first device's gamut to the second device's gamut. A user-perceived quality of the representation at the second device is affected by the quality of the gamut mapping between the two devices. Existing gamut mapping evaluation techniques are unsophisticated and generally involve mapping from a first device to a second device, first with one gamut mapper, and then with a second gamut mapper. A human subject compares the visual results produced by the two different gamut mappers and decides which gamut mapper did a better job.

SUMMARY

Techniques relating to gamuts and gamut mapping are described. In one instance, a process identifies a gamut attribute and generates a gamut having the attribute.

In another instance, a process supplies at least one pair of gamuts. The process causes mapping between the at least one pair of gamuts and evaluates the mapping based upon one or more quantifiable parameters.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

DETAILED DESCRIPTION

Overview

Figure 1:
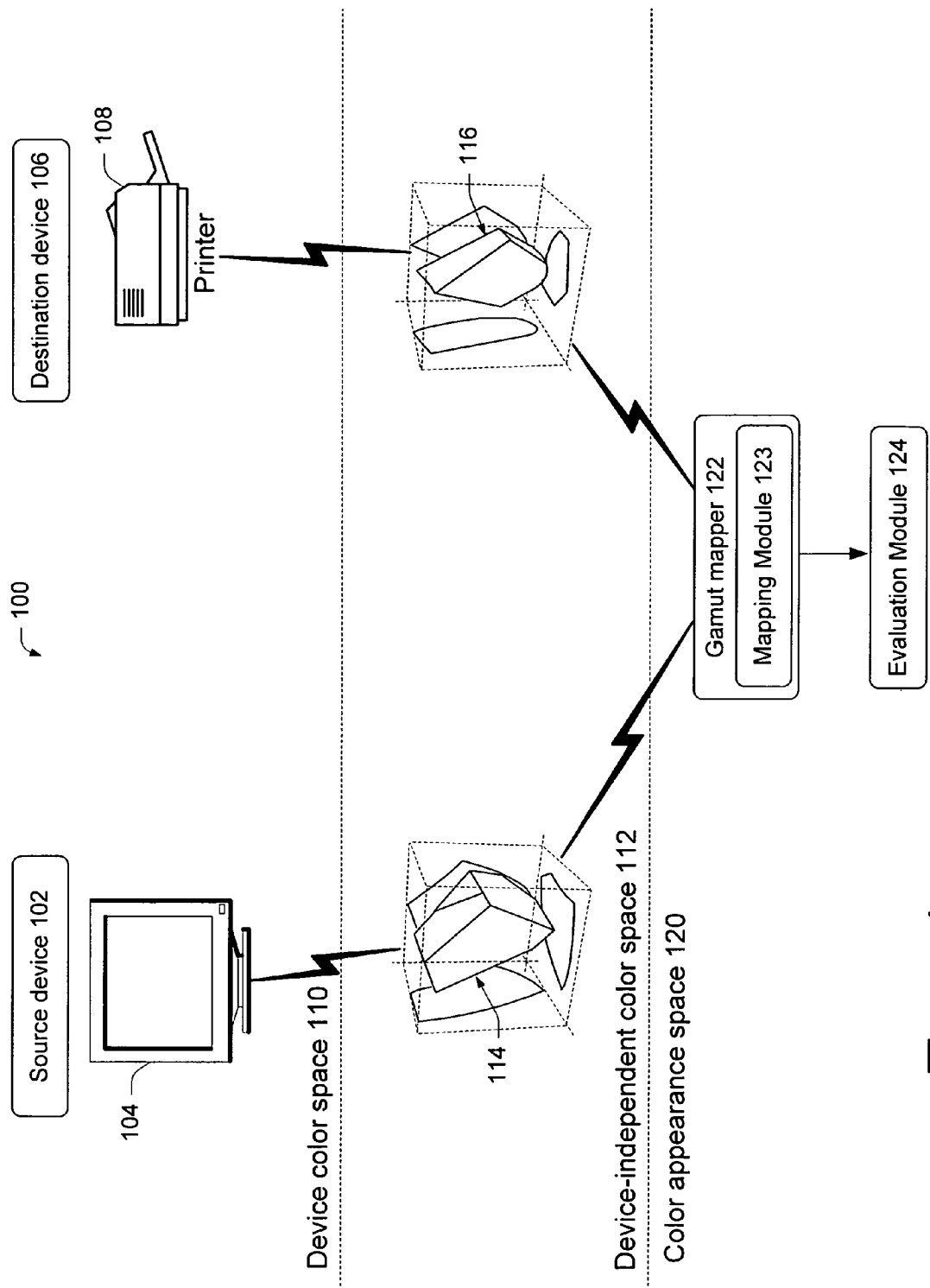
FIGS. 1-2 illustrate exemplary systems for gamut mapping and gamut mapping evaluation in accordance with one implementation.

Color management facilitates robust image generation across multiple devices. Color management utilizes a gamut mapper which maps from a source device gamut to a destination device gamut while taking into consideration differences between the two gamuts. Evaluating gamut mapper performance can promote color generation consistent with user expectations. Gamut mapper performance can be evaluated using quantifiable measurements related to, for instance, image quality output, robustness, and execution time, among others, as will be described in more detail below.

At least some of the following implementations allow for quantifiable evaluation of the performance of various gamut mappers. For instance, various gamut attributes or properties can be identified. A fictitious gamut having the identified attributes can be generated. Gamut mappers can be utilized to map to and/or from the fictitious gamut. For instance, a gamut mapper can be utilized to map from the fictitious gamut to another gamut. One or more parameters relating to mapping to or from the gamut's attributes can be identified. Various gamut mappers can be evaluated by mapping between the two gamuts and quantifiably evaluating the parameters in each instance.

In one scenario, the performance of gamut mappers may be tested by mapping between one or more pairs of gamuts and utilizing quantifiable parameters to evaluate the performance of individual gamut mappers. Some gamut evaluation scenarios can run large numbers of gamut pairs through the gamut mappers under test and can also utilize gamuts having attributes which may be especially indicative of the relative mapping ability and overall robustness of various gamut mappers.

In some gamut mapper evaluation scenarios, gamuts can be generated or fictitious rather than being obtained from a real device, such as a printer or monitor. In some instances, the generated gamuts may be particularly complex or otherwise notably valuable for testing the gamut mappers. For example, specific generated gamuts may have attributes, such as, for instance, discontinuities and/or internal voids, which are not commonly found in real device gamuts. Gamut mappers which perform well on the specific generated gamuts may prove useful in achieving enhanced color management in real world usage including future scenarios where devices have relatively more complex gamuts than are generally encountered today.

At least some of the described scenarios automatically generate fictitious gamuts to simulate current and/or future device gamuts. These scenarios can evaluate gamut mappers by causing the gamut mappers to map or translate between the generated gamuts and by applying logic to quantify mapping quality. Gamut mappers which excel in such robust scenarios are more likely to perform well with real-world device gamuts which may be encountered. Such a well tested gamut mapper can reliably map device gamuts at run time rather than relying on pre-determined gamut mapping look-up tables. Mapping a system at run time allows an infinite amount of gamuts to be mapped as new devices and system configurations are encountered. In contrast, gamut mapping look-up tables consume memory for each additional device that is encompassed.

Exemplary Systems

FIG. 1 shows an exemplary system 100 for evaluating gamut mapper performance from a color management perspective in accordance with one implementation. System 100 includes a source device 102, which in this instance is manifested as a monitor 104 and a destination device 106, which in this instance is manifested as a printer 108. While the source and destination devices are represented here as a monitor and a printer for purposes of explanation, other examples can include, but are not limited to, scanners, multi-function peripherals (MFPs), cameras, camera phones, televisions etc.

Source device 102 and destination device 106 operate in a device color space 110. Within the device color space the devices have device model color profiles containing the colors which the respective devices can reproduce. The device model color profile for a particular device, such as monitor 104 can be estimated by gathering multiple sample points from the device.

The device model color profile can be utilized in a device-independent color space 112 to formulate a color gamut for an individual device. In one such instance, the gamut is formed by building a shell which intersects the sample points of the device model color profile mentioned above. In one scenario, building a shell entails creating a multitude of triangles having vertices which touch dimensions of the color model profile via the sample points. In this example, a gamut 114 is representative of source device 102, while a gamut 116 is representative of destination device 106.

Residing within a color appearance space 120 is a gamut mapping mechanism or gamut mapper 122 manifested in this instance as mapping module 123. The gamut mapper 122 is configured to map from the source gamut 114 to the destination gamut 116. In various scenarios, the gamut mapper 122 serves to either clip a source image range to the destination gamut, or compress the source gamut to fit within the destination gamut. For instance, the gamut mapping may involve compressing and clipping in different directions, or may involve dividing the gamut into different regions and performing clipping or compression in the different regions so that images formed on the destination device more closely approximate images formed on the source device. In this configuration, mapping module 123 function in cooperation with an operating system (not specifically designated) to allow mapping from a source device gamut to a destination device gamut to occur at run time rather than relying on pre-established mapping tables or other mapping aids. Such a configuration can readily handle newly available source and/ or destination devices whose gamuts may not match any previously known device gamuts.

An evaluation module or evaluation plug-in 124 is configured to evaluate the performance of gamut mapper 122. For instance, evaluation module 124 can measure one or more quantifiable parameters relative to an image mapped from the source gamut 114 to the destination gamut 116. For instance, gamut attributes which may be useful for gamut mapping evaluation may be identified in one or both of the source and destination gamuts. One or more parameters associated with mapping in relation to the attribute(s) can be identified and measured. Instances of evaluation module 124 will be described in more detail below.

Figure 2:
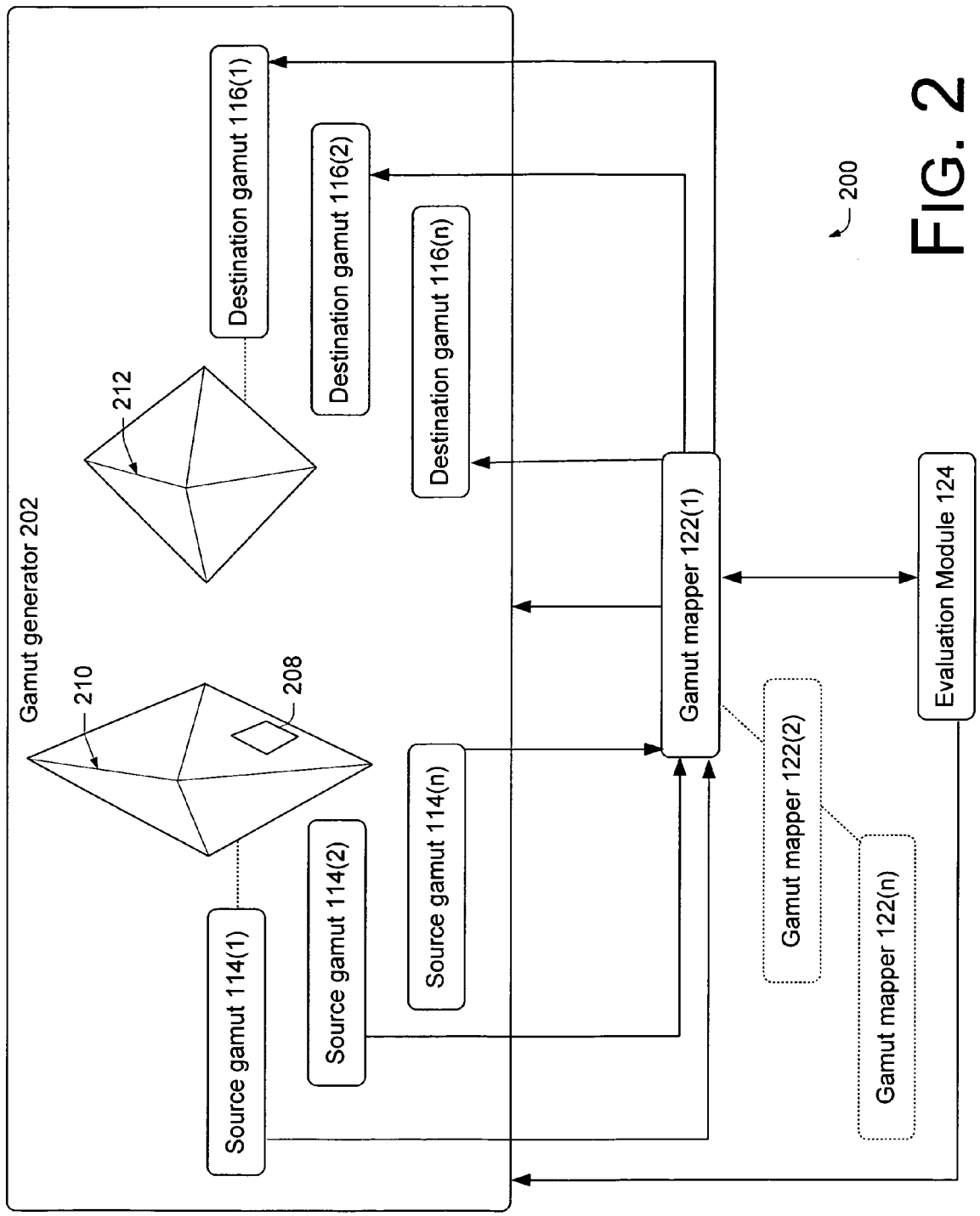

FIG. 2 illustrates a system 200 where a gamut generator 202 generates gamuts for use in evaluating gamut mapping performance in accordance with one implementation. In this particular configuration, gamut generator 202 generates pairs of gamuts. An individual gamut from each pair is assigned as a source gamut 114(1)-114(n), while the remaining gamut from each pair is assigned as a destination gamut 116(1)-116 (n) respectively. Due to the physical constraints of the physical page upon which FIG. 2 appears, only source gamut 114(1) and destination gamut 116(1) are graphically represented, the remaining gamuts are represented only as component boxes. Further, while pairs of gamuts are generated by gamut generator 202 in this instance, other configurations may generate a gamut for either the source or destination and utilize a known device gamut in the other position. In some scenarios, gamuts are generated as derivatives of an actual device model gamut. For instance, a particular device model gamut may be selected and then one or more attributes of the gamut altered to generate one or more new gamuts. For example, source gamut 114(1) contains a generated internal void 208 in a gamut which otherwise can represent a real device gamut. An extension of altering gamut attributes is "fuzzing" the gamuts. Fuzzing focuses on testing robustness of the gamut mapper rather than image quality. For instance, such a fuzzing scenario tests whether the gamut mapper crashes or hangs. In one fuzzing scenario, a series of manipulations is done to the gamut. In some instances, fuzzing involves purposefully adjusting specific values related to specific attributes. In other instances fuzzing involves random changes. If the gamut mapper handles the manipulated gamut successfully, then the manipulated gamut is utilized as the starting point for the next manipulation. In an example of fuzzing based on random changes, a successive gamut is generated which adjusts one or more operations such as zoom, rotate, shift, clip, randomizing vertices' locations, adding extra triangles or neutral points, etc. This process may be repeated thousands or even millions of times if the gamut mapper continues to successfully map the consecutively generated gamuts. In the example of FIG. 2, feedback from gamut mapper 122(1) to gamut generator 202 can allow the gamut generator to know whether the gamut mapper successfully maps a specific gamut pair. In an instance where gamut mapper 122(1) successfully maps the gamuts, the gamut generator can generate the next gamut for testing. In a further feedback scenario, in some instances, evaluation module 124 may affect or otherwise control the gamuts which are generated by gamut generator 202. For instance, the evaluation module may detect that the gamut mapper 122(1) did not handle a particular attribute very well. The evaluation module can then cause the gamut generator to accentuate that particular attribute in the next generated gamut.

Performance characteristics of various gamut mappers can be evaluated by mapping between the generated gamut pairs. For instance, gamut mappers 122(1)-122(n) can be employed in turn to map each of the generated gamut pairs. The performance of the various gamut mappers can be based upon a relative comparison against one another, and/or based upon a comparison to a known standard. In some instances, the performance of the gamut mappers can be evaluated by a human subject who compares images produced through utilization of the various gamut mappers. Alternatively or additionally, the gamut mappers may be evaluated by evaluation module 124 in an automated manner utilizing one or more quantifiable parameters. For example, one parameter might be what percentage of the destination gamut's volume is mapped by the gamut mapper. Or stated another way, how much of the potential of the destination gamut is left un-utilized by the gamut mapper? In another example, such parameters can include how closely the gamut mapper maps from a neutral axis 210 of the source gamut to a neutral axis 212 of the destination gamut. A neutral axis extends from a black region to a white region of the gamut and through shades of grey extending therebetween.

Gamuts and Gamut Generators

FIGS. 3-7 illustrate examples of gamuts which may be useful in evaluating gamut mapping in accordance with one implementation. Some of the gamuts illustrated in these Figures may be termed fictitious gamuts in that the gamuts do not represent actual device model color profiles and are instead generated randomly or upon specified criteria to exhibit certain attributes. These Figures illustrate gamuts having one or more attributes which may be useful in evaluating gamut mapping performance in that gamut mappers which can successfully map to or from these attributes are more likely to properly handle a wide range of device gamuts which may be encountered. Examples of such attributes include, but are not limited to: dynamic range, primary chroma, monotonic/non-monotonic, continuity/discontinuity, linearity/non-linearity, concave/convex, and internal voids, among others. In another instance, gamut attributes can refer to the representation of the shape rather than the shape itself. For example, a density of the triangles comprising the gamut, whether some of the triangles contain identical vertices, whether the shape is closed or not, among others. Attributes can also refer to which sets of neutral and primary points are provided to the gamut mapper for each source and destination gamut. Further still, attribute manipulation and fuzzing can be done on all three of the above described properties.

Figure 3:
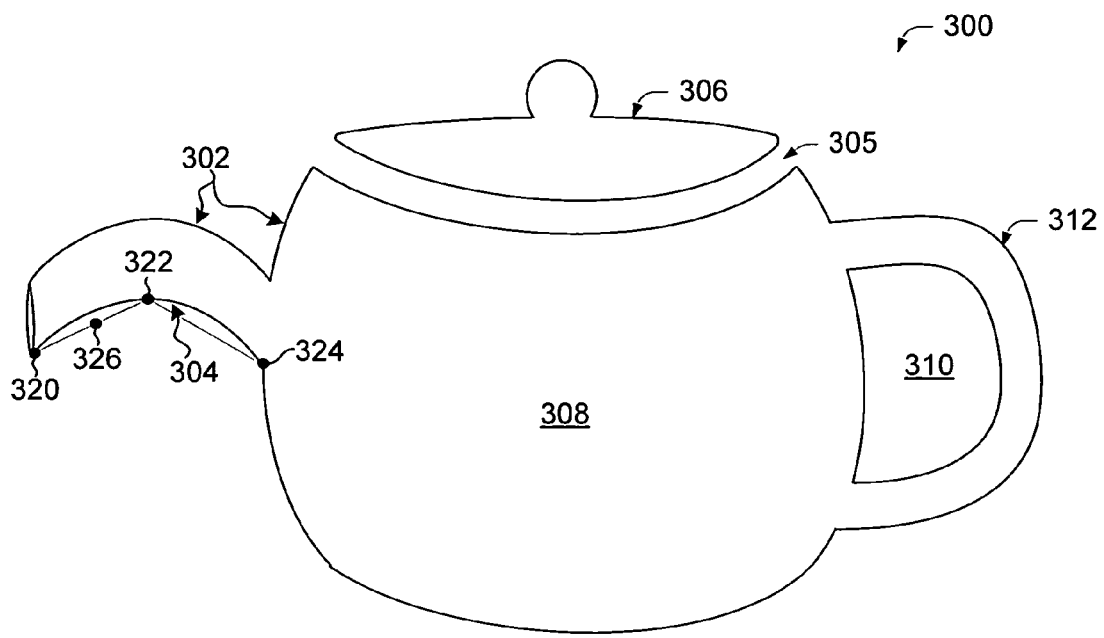
FIGS. 3-7 illustrate exemplary gamuts and gamut evaluation in accordance with one implementation.

FIG. 3 illustrates an exemplary gamut 300 having attributes which may be valuable in evaluating gamut mapping performance. Gamut 300 resembles a Blinn/Newell teapot as will be recognized by the skilled artisan, and exemplifies several of the attributes of interest for evaluating gamut mapping. For instance, gamut 300 has regions which are convex indicated generally at 302, as well as regions which are concave indicated generally at 304. Gamut 300 also has a discontinuity indicated generally at 305 where a 'lid' region 306 is separate and distinct from a main 'body' region 308. The gamut also has an internal void 310 between a handle region 312 and the main body 308. These attributes provide examples of the types of attributes which can prove useful in evaluating gamut mapping performance. For instance, some gamut mapping algorithms are based on a presumption of a convex gamut shape. Gamut mappers employing such an algorithm may not recognize concavity such as represented by region 304 and may map to points outside the gamut. One such example is illustrated in relation to hypothetical mapped points 320, 322, and 324. If a gamut mapper's algorithm assumes that the gamut is straight or convex between these points, the gamut mapper may map to a hypothetical point 326 which lies outside the gamut.

Figure 4:
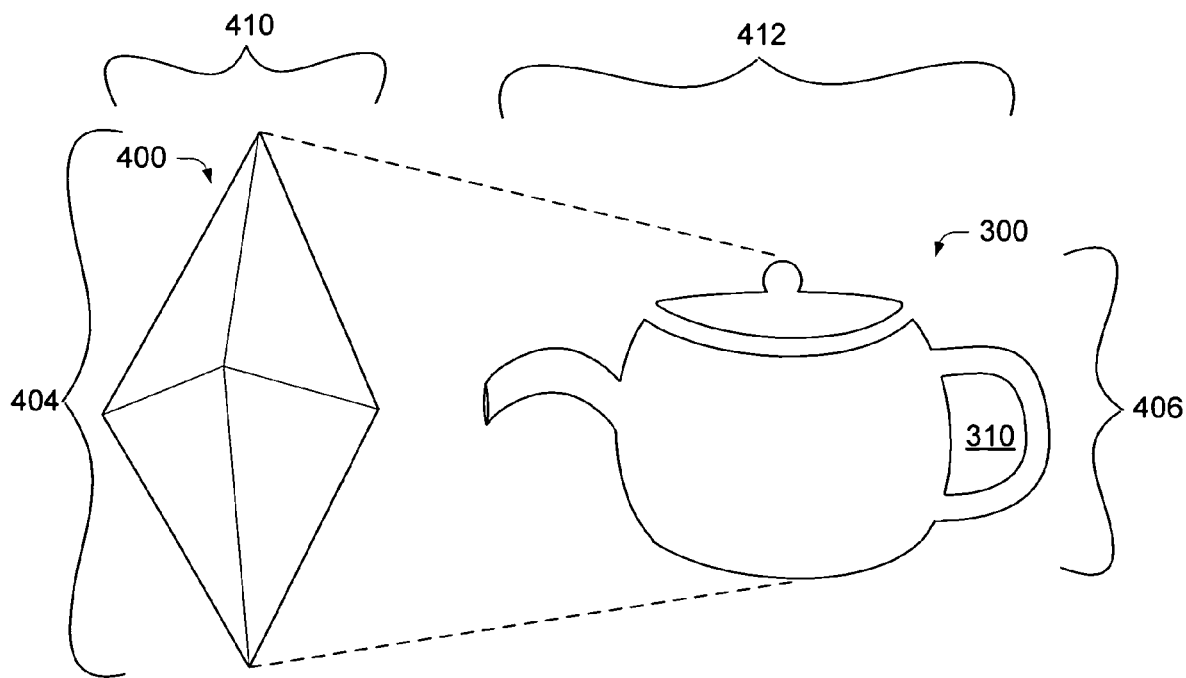

FIG. 4 illustrates another example of how gamut 300 may be utilized in evaluating gamut mapping performance. In such an instance, the evaluation can be based on specific mapping parameters related to gamut attributes. In this example, gamut 300 is paired with a gamut 400 having a more customary gamut shape. Gamut mapping can be evaluated by the ability to map between gamut 400 and gamut 300. For instance, one parameter which can be evaluated is the ability of the gamut mapping to handle mapping from continuous gamut 400 to the discontinuity manifested at 305 in gamut 300. Similarly, another parameter is the gamut mapper's ability to handle mapping to the internal void 310 of gamut 300. Still other evaluation parameters can be based on the ability of the gamut mapper to handle a change in dynamic range between gamut 400 and gamut 300. The dynamic range is a grayscale of the respective gamut from lightest to darkest. The dynamic range of gamut 400 is designated generally at 404 while the dynamic range of gamut 300 is designated generally at 406. A further parameter is the ability of a gamut mapper to handle a difference in chroma from gamut 400 to gamut 300. The chroma or color intensity of gamut 400 is designated generally at 410 while the chroma of gamut 300 is designated generally at 412. One or more of the above mentioned parameters can be quantitatively determined as a basis for the gamut mapping evaluation.

In some mapping scenarios where the gamuts include multiple attributes, the attributes may be assigned a relative importance for evaluation of gamut mapping performance. For instance, in the example illustrated in FIG. 4, an ability to handle the internal void may be ranked higher or of more relative importance, while an ability to handle the change in dynamic range may be assigned a lesser importance. Stated another way, for evaluation purposes it may be deemed more important that a gamut mapping successfully map in a manner which effectively handles internal void 310 than map to utilize all of the destination device's dynamic range 406. In one such configuration those attributes, which when mapped to or from, are more likely to cause the gamut mapper to crash are assigned a higher importance than other attributes which are less likely to cause the gamut mapper to crash.

In some instances, beyond generating a single gamut, a gamut generator can define a range of values associated with individual gamut attributes and generate a series of gamuts reflecting changing values within the range. A gamut mapper's performance can then be evaluated based upon one or more parameters in relation to the attribute. One such example is illustrated below in relation to FIGS. 5-7, which for purposes of explanation, vary a single gamut attribute while maintaining a constant value on other attributes. In other instances the values of multiple gamut attributes may be altered simultaneously.

In at least some implementations, the parameters for fictitious gamuts can be set by a skilled artisan by use of a user-interface, registry database, or command line arguments for programs that support such options. Some implementations group parameters as either color difference parameters or non-color difference parameters. Color difference is defined to be the perceptual color difference between two colors. The color difference between the two colors is computed as the Euclidean distance (square root of the sum of the squares) in a rectilinear perceptually uniform space such as International Commission on Illumination defined CIECAM02, CIELAB, or CIEUVW. Similarly, the color difference can be computed in a polar space where the dimensions are lightness, chroma, and hue instead of lightness, redness-greenness, and blueness-yellowness. Utilizing this definition, in combination with the concepts described above and below allows a skilled artisan to take any of the three dimensions of the perceptually uniform space and derive a parameter. For example, one implementation could include a gamut evaluation parameter that states the mapping must not have a hue difference of greater than 3 degrees at any point in the gamut.

Figure 5:
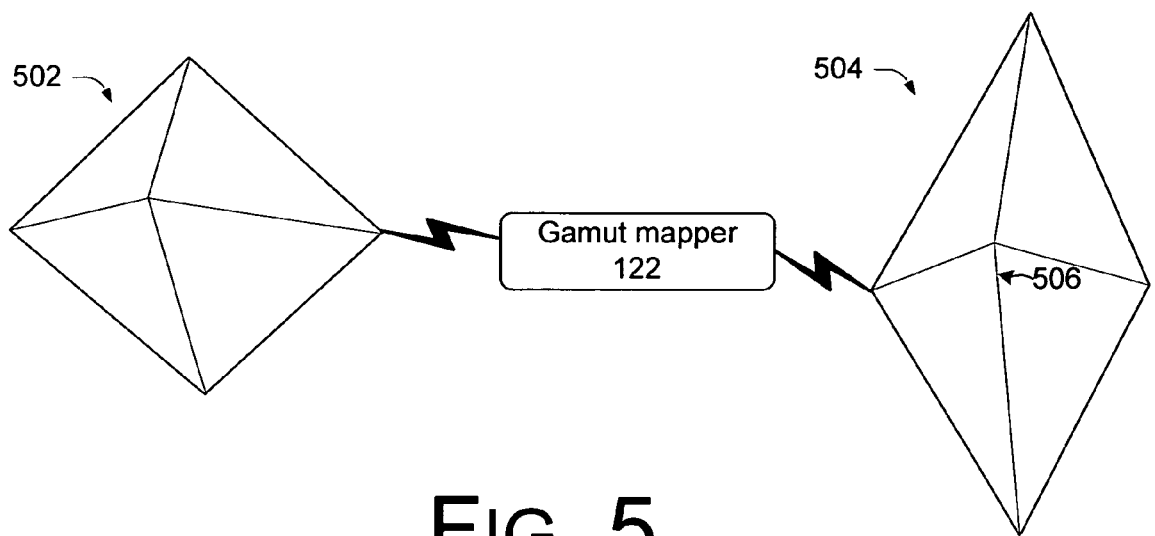
Figure 6:
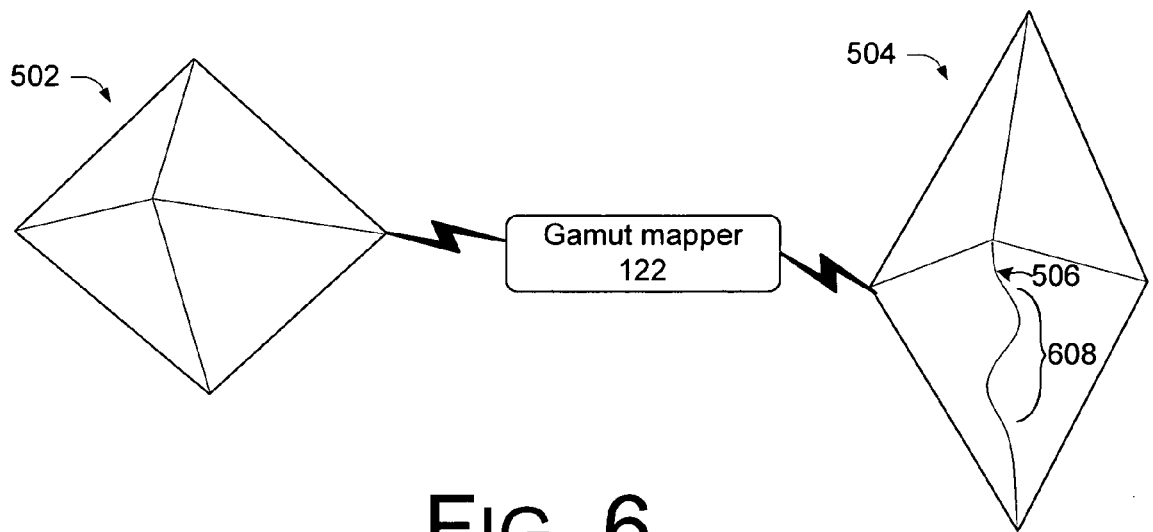
Figure 7:
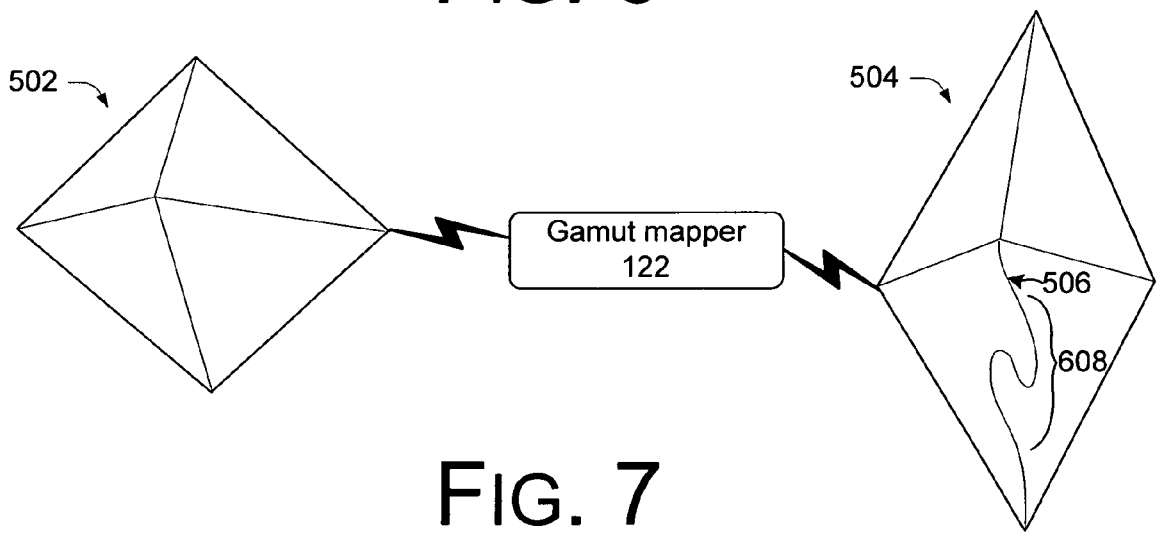

As illustrated collectively in FIGS. 5-7, a monotonic/non-monotonic attribute is altered for evaluating gamut mapping performance. The attribute is varied between sequentially generated gamuts and mapping performance evaluated for the varied configurations.

In this example, the monotonic/non-monotonic attribute is expressed along a single dimension of the test gamut. In this instance, a first gamut 502 is maintained at a constant configuration for FIGS. 5-7. Gamut mapper 122 maps between first gamut 502 and a second gamut 504. The second gamut has a dimension represented by line 506 which is altered between the three Figures. A first value related to line 506 is manifested in FIG. 5. As represented in FIG. 5, line 506 is generally monotonic in that the line proceeds generally from the top of the printed page upon which the Figure appears toward the bottom of the page.

As evidenced in FIG. 6, a value of line 506 has been adjusted such that a region of the line indicated generally at 608 is somewhat sinusoidal and the line begins to turn back on itself. As can be evidenced from FIG. 7 the value of line 506 has been further changed such that, at region 608, line 506 now turns back upon itself or reverses direction before continuing in the original direction. Gamut mappers that can handle the configuration illustrated in FIG. 5 may have difficulty mapping to the configurations illustrated in FIG. 6 and/ or FIG. 7. Varying a state of the attribute in sequential gamuts allows a more thorough evaluation of the gamut mapper than may be obtained with a single gamut.

Mapping Evaluation

Figure 8:
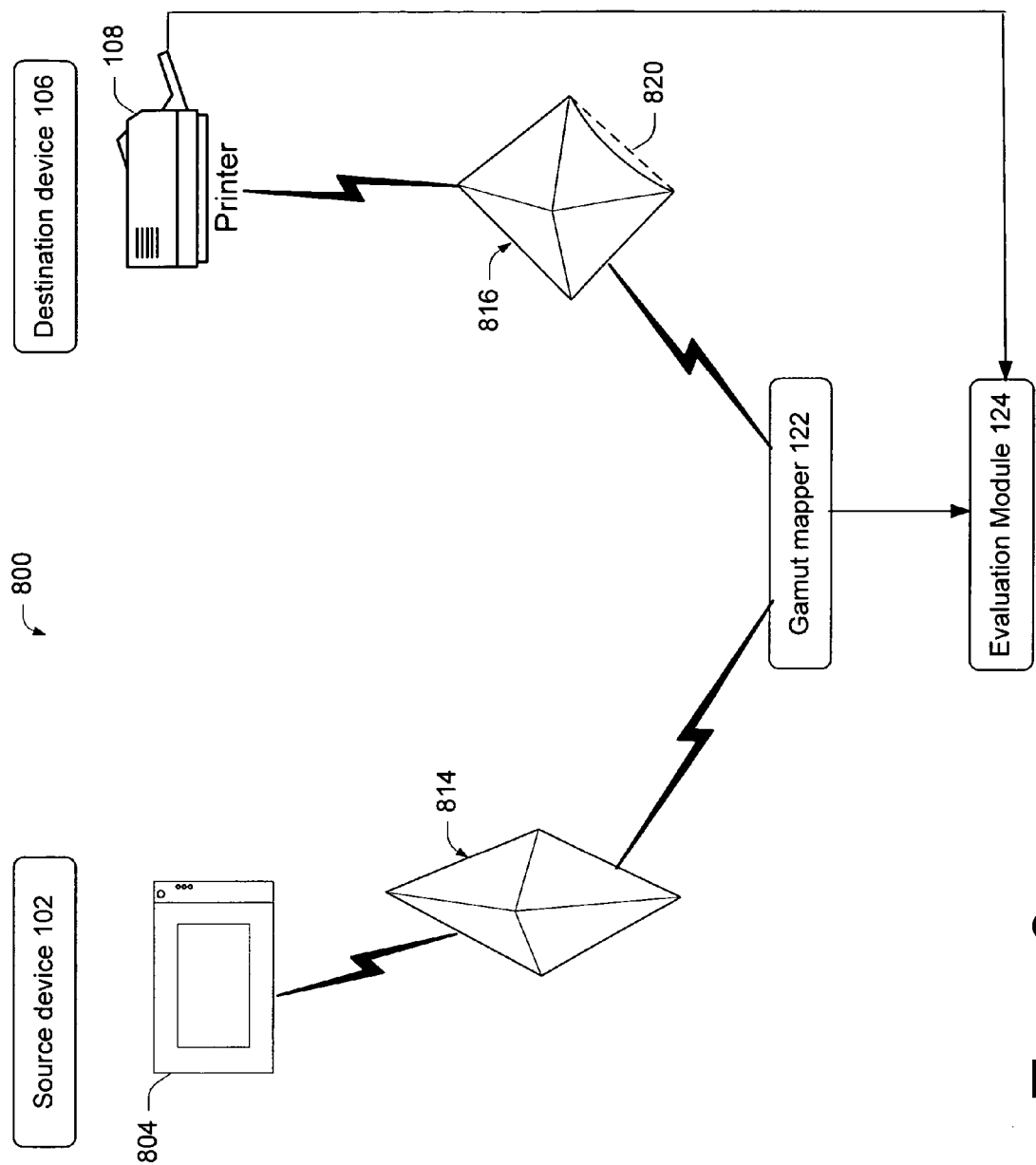
FIG. 8 illustrates an exemplary system for gamut mapping and gamut mapping evaluation in accordance with one implementation.

Gamut mapping evaluation can be accomplished in various system configurations. FIG. 8 illustrates an example of one such system configuration 800. In this instance, the mapping evaluation functionality is provided by a pluggable evaluation module 124. In this example, the evaluation module is added or plugged into the system to test mapping performance and can remain in the system or can be removed upon completion of testing. The evaluation module 124 can evaluate mapping performance of gamut mapper 122 as described above in relation to FIGS. 1-7. Alternatively or additionally the evaluation module 124 can be utilized to evaluate other system components which perform a gamut mapping functionality. For example, one such system component may be the destination device.

For instance, consider the following scenario. A source device 102 manifested as a scanner 804 has a source gamut 814 that is mapped to a destination gamut 816 of a destination device 106 manifested as a printer 108. Assume for purposes of explanation that gamut mapper 122 inaccurately maps between source gamut 814 and destination gamut 816 such that it inaccurately maps to colors outside of the destination gamut. For example, assume that the gamut mapper maps to colors along dotted line 820 which lie outside the destination gamut 816. The destination device, which in this instance is manifested as printer 108, acts upon data received from the gamut mapper to generate an image. In the event of erroneous data relating to colors which the destination device cannot produce, the destination device may generate an error due to being instructed to print colors it is not capable of printing. Alternatively, the destination device, such as within its driver, may re-map the instructed but erroneous colors to colors which the device is capable of printing. Evaluation module 124 can quantitatively evaluate this mapping process in a similar fashion to evaluating a dedicated gamut mapper such as gamut mapper 122. So for instance, the evaluation module can be utilized to evaluate competing destination device algorithms for handling such scenarios. For example, evaluation modules can be utilized by a skilled artisan to trade off performance vs. accuracy or to weight multiple parameters such as performance, accuracy, memory color preference (green grass greener, skin tones redder not greener, etc), among other considerations. Other possible configurations should be recognized by the skilled artisan.

Exemplary System Environment

Figure 9:
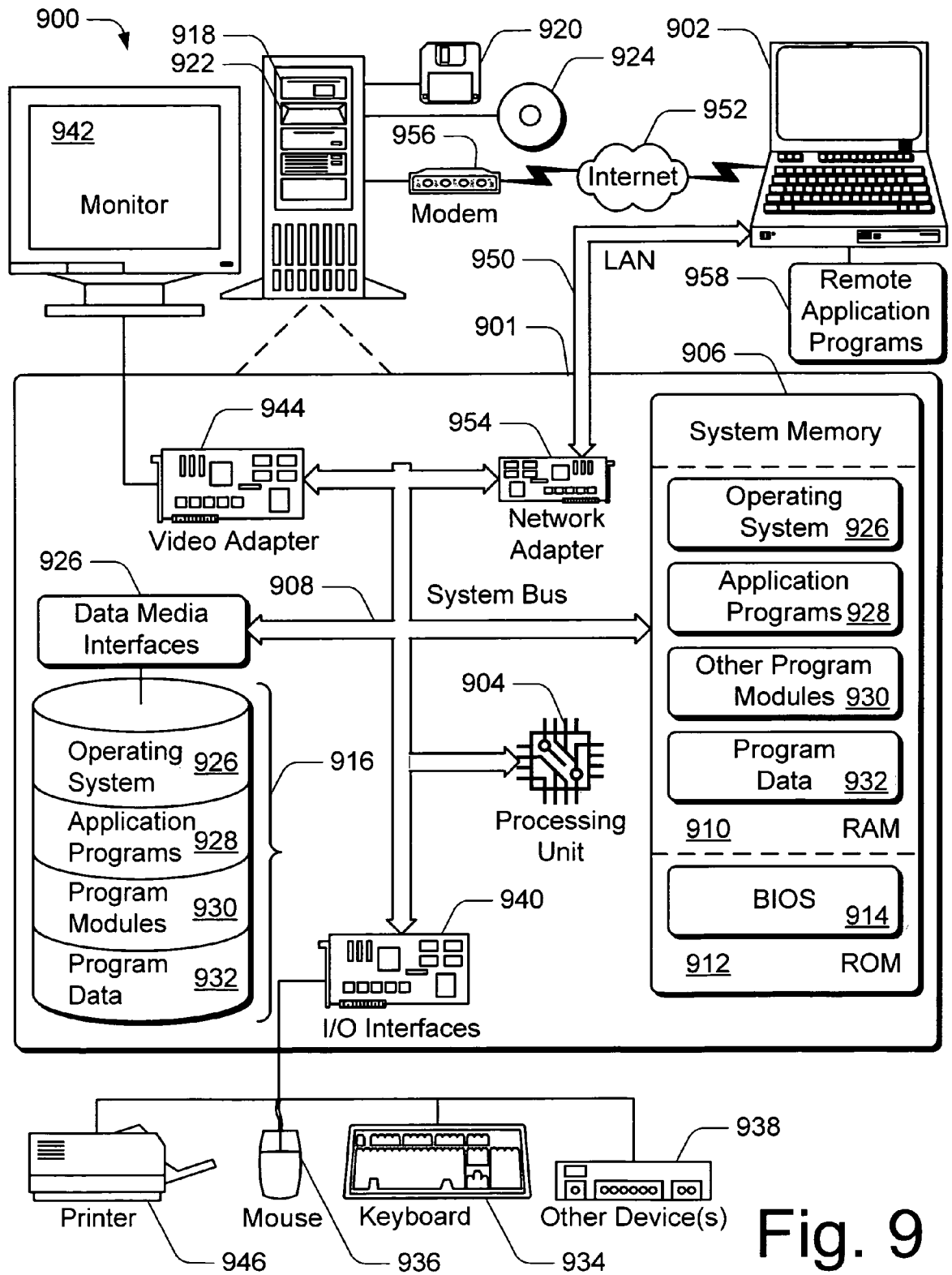
FIG. 9 illustrates exemplary systems, devices, and components in an environment for mapping gamuts between a source device and a destination device.

FIG. 9 represents an exemplary system or computing environment 900 upon which gamut mapping may be implemented. System 900 includes a general-purpose computing system in the form of a first machine 901 and a second machine 902.

The components of first machine 901 can include, but are not limited to, one or more processors 904 (e.g., any of microprocessors, controllers, and the like), a system memory 906, and a system bus 908 that couples the various system components. The one or more processors 904 process various computer executable instructions to control the operation of first machine 901 and to communicate with other electronic and computing devices. The system bus 908 represents any number of several types of bus structures, including a memory bus or memory controller, a peripheral bus, an accelerated graphics port, and a processor or local bus using any of a variety of bus architectures.

System 900 includes a variety of computer readable media which can be any media that is accessible by first machine 901 and includes both volatile and non-volatile media, removable and non-removable media. The system memory 906 includes computer-readable media in the form of volatile memory, such as random access memory (RAM) 910, and/or non-volatile memory, such as read only memory (ROM) 912. A basic input/output system (BIOS) 914 maintains the basic routines that facilitate information transfer between components within first machine 901, such as during start-up, and is stored in ROM 912. RAM 910 typically contains data and/or program modules that are immediately accessible to and/or presently operated on by one or more of the processors 904.

First machine 901 may include other removable/non-removable, volatile/non-volatile computer storage media. By way of example, a hard disk drive 916 reads from and writes to a non-removable, non-volatile magnetic media (not shown), a magnetic disk drive 918 reads from and writes to a removable, non-volatile magnetic disk 920 (e.g., a "floppy disk"), and an optical disk drive 922 reads from and/or writes to a removable, non-volatile optical disk 924 such as a CD-ROM, digital versatile disk (DVD), or any other type of optical media. In this example, the hard disk drive 916, magnetic disk drive 918, and optical disk drive 922 are each connected to the system bus 908 by one or more data media interfaces 926. The disk drives and associated computer readable media provide non-volatile storage of computer readable instructions, data structures, program modules, and other data for first machine 901.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, application programs 928, other program modules 930, and program data 932 (or some combination thereof) may include an embodiment of the systems and methods described herein.

A user can interface with first machine 901 via any number of different input devices such as a keyboard 934 and pointing device 936 (e.g., a "mouse"). Other input devices 938 (not shown specifically) may include a microphone, joystick, game pad, controller, satellite dish, serial port, scanner, and/or the like. These and other input devices are connected to the processors 904 via input/output interfaces 940 that are coupled to the system bus 908, but may be connected by other interface and bus structures, such as a parallel port, game port, and/or a universal serial bus (USB).

A monitor 942 or other type of display device can be connected to the system bus 908 via an interface, such as a video adapter 944. In addition to the monitor 942, other output peripheral devices can include components such as speakers (not shown) and a printer 946 which can be connected to first machine 901 via the input/output interfaces 940.

First machine 901 can operate in a networked environment using logical connections to one or more remote computers, such as second machine 902. By way of example, the second machine 902 can be a personal computer, portable computer, a server, a router, a network computer, a peer device or other common network node, and the like. The second machine 902 is illustrated as a portable computer that can include many or all of the elements and features described herein relative to first machine 901.

Logical connections between first machine 901 and the second machine 902 are depicted as a local area network (LAN) 950 and a general wide area network (WAN) 952.

Such networking environments are commonplace in offices, enterprise-wide computer networks, intranets, and the Internet. When implemented in a LAN networking environment, the first machine 901 is connected to a local network 950 via a network interface or adapter 954. When implemented in a WAN networking environment, the first machine 901 typically includes a modem 956 or other means for establishing communications over the wide area network 952. The modem 956, which can be internal or external to first machine 901, can be connected to the system bus 908 via the input/output interfaces 940 or other appropriate mechanisms. The illustrated network connections are exemplary and other means of establishing communication link(s) between the first and second machines 901, 902 can be utilized.

In a networked environment, such as that illustrated with System 900, program modules depicted relative to the first machine 901, or portions thereof, may be stored in a remote memory storage device. By way of example, remote application programs 958 are maintained with a memory device of second machine 902. For purposes of illustration, application programs and other executable program components, such as the operating system 926, are illustrated herein as discrete blocks, although it is recognized that such programs and components reside at various times in different storage components of the first machine 901, and are executed by the processors 904 of the first machine.

Exemplary Processes

Figure 10:
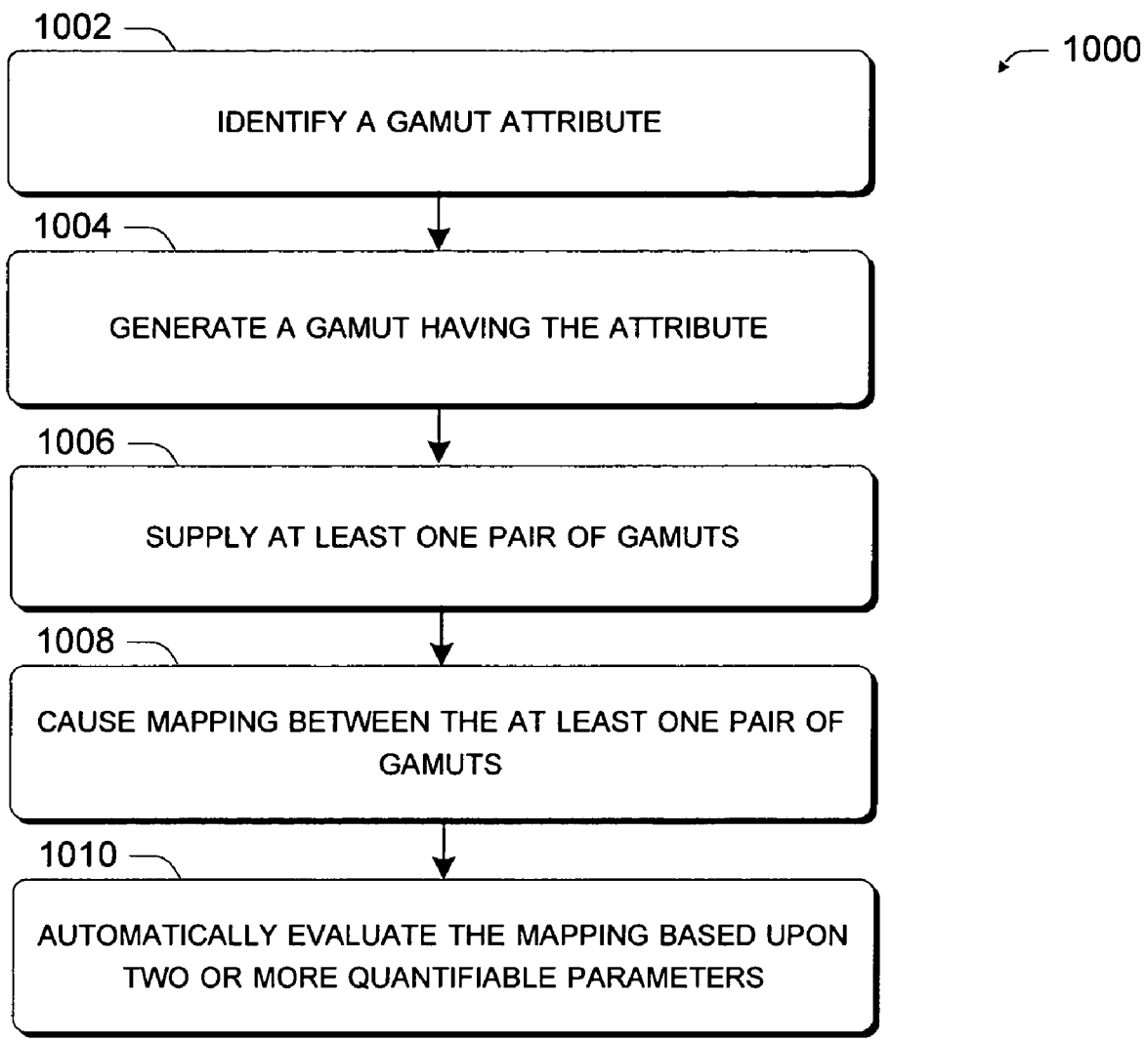
FIG. 10 illustrates an exemplary process diagram relating to gamuts and gamut mapping in accordance with one implementation.

FIG. 10 illustrates an exemplary process 1000 for generating gamuts and evaluating gamut mapping performance in accordance with one implementation. The order in which the process is described is not intended to be construed as a limitation, and any number of the described process blocks can be combined in any order to implement the process. Furthermore, the process can be implemented in any suitable hardware, software, firmware, or combination thereof.

At block 1002 the process identifies a gamut attribute. The gamut attribute can be selected as being useful in evaluating gamut mapping performance. Non-limiting examples of such gamut attributes are described in more detail above, and can for example include, internal voids, discontinuities, non-monotonic gamut dimensions, non-linearity, and concave gamut surfaces, among others. Such gamut attributes can prove especially difficult to map and gamut mappers which perform well mapping to and from such gamuts are likely to perform well in real-world scenarios.

At block 1004 the process generates a gamut having the attribute. Examples of gamut generating mechanisms are described above. Various processes can be employed to generate the gamut. In some instances, a range of values can be assigned to a particular attribute so that a series of gamuts can be generated in which the attribute is altered. For instance, a first generated gamut may represent a high degree of linearity such that along a given dimension a spacing interval of adjacent values remains constant. A second generated gamut may have regions along the dimension with constant spacing intervals and other regions with unequal spacing distances. Still a third generated gamut may manifest unequal spacing intervals throughout the dimension. The gamuts generated at block 1004 may be utilized below for the process described in relation to blocks 1006-1010.

At block 1006 the process supplies at least one pair of gamuts. The supplied gamuts can be useful in evaluating gamut mapping performance and are supplied to evaluate a gamut mapping functionality. One or both of the pair of gamuts can be generated to express particular gamut attributes as described above at block 1004.

At block 1008 the process causes mapping between the at least one pair of gamuts. In some instances, the process causes multiple different mapping mechanisms to map between the gamuts to facilitate evaluating gamut mapping performance of the different gamut mapping mechanisms.

At block 1010 the process automatically evaluates the mapping based upon two or more quantifiable parameters wherein an individual quantifiable parameter is not a color difference parameter. For instance, one parameter can be a percentage of the volume of the destination gamut which is mapped by the gamut mapping.

Although implementations relating to gamuts and gamut mapping have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A method comprising:
supplying at least one pair of gamuts, wherein:
the at least one pair of gamuts comprises a first gamut and a second gamut, at least one of the first gamut and the second gamut being a fictitious gamut that does not represent an actual device color profile; and
the first gamut comprises one or more gamut attributes useful in evaluating gamut mapping performance;
causing mapping between the at least one pair of gamuts, wherein the one or more attributes from the first gamut are mapped to the second gamut; and,
automatically evaluating said mapping based upon two or more quantifiable parameters wherein an individual quantifiable parameter is not a color difference parameter and the two or more quantifiable parameters comprise:
a number representing ability of the mapping of the one or more attributes from the first gamut to the second gamut; and
one or more of:
a percentage representing how much the second gamut's volume is mapped from the first gamut; and
a number representing how closely the mapping is from a neutral axis of the first gamut to the neutral axis of the second gamut, the neutral axis extending from a black region to a white region of the gamut and through shades of grey extending therebetween.

2. The method as recited in claim 1, wherein the supplying comprises generating the fictitious gamut, and wherein the fictitious gamut is a derivation of an actual device color profile.

3. The method as recited in claim 1, wherein the supplying comprises supplying multiple pairs of gamuts.

4. The method as recited in claim 3, wherein the causing comprises causing mapping between first and second gamuts of each of the multiple pairs of gamuts.

5. The method as recited in claim 4, wherein the evaluating comprises assigning a relative importance to individual pairs of gamuts and weighting said evaluating based upon said relative importance.

6. The method as recited in claim 1, wherein the causing comprises causing mapping with at least two different gamut mapping mechanisms.

7. The method as recited in claim 1, wherein the supplying comprises supplying first and second gamuts of the at least one gamut pair wherein at least one of the first and second gamuts has one or more attributes comprising: non-linearity, non-monotonic, discontinuity, concavity, and internal voids.

8. The method as recited in claim 7, wherein at least some of the parameters are associated with measuring the mapping of an individual attribute.

9. The method as recited in claim 1, wherein the evaluating comprises identifying multiple attributes of individual gamuts and assigning a relative importance of said mapping to handle individual attributes.

10. One or more computer-readable storage media having stored thereon a plurality of executable instructions which, when executed, implement the method as recited in claim 1.

11. A method, implemented at least in part by a computing device, comprising:
- selecting a gamut attribute for evaluating gamut mapping performance;
- selecting a fictitious gamut that comprises the gamut attribute wherein the selected fictitious gamut does not represent an actual device color profile;
- mapping the selected fictitious gamut and another gamut associated with an actual device;
- evaluating the mapping using at least two quantifiable parameters that comprise non-color difference parameters;
- based on the evaluating, deciding if the mapping conforms to a gamut mapping performance standard for the selected gamut attribute; and
- if the mapping does not conform to the gamut mapping performance standard, selecting a different fictitious gamut that comprises the gamut attribute and, for the different fictitious gamut, repeating the mapping, the evaluating and the deciding, wherein the two or more quantifiable parameters comprise:
- a number representing ability of the mapping of the one or more attributes from the first gamut to the second gamut; and
- one or more of:
    - a percentage representing how much the second gamut's volume is mapped from the first gamut; and
    - a number representing how closely the mapping is from a neutral axis of the first gamut to the neutral axis of the second gamut, the neutral axis extending from a black region to a white region of the gamut and through shades of grey extending therebetween.

12. The method of claim 11, wherein the selected gamut attribute comprises a high likelihood of crashing a gamut mapper.

13. The method of claim 11, further comprising repeating the method for a different gamut attribute.

14. The method of claim 13, wherein the different gamut attribute comprises a lesser likelihood of crashing a gamut mapper than the previously selected gamut attribute.

15. One or more computer-readable storage media having stored thereon a plurality of executable instructions which, when executed, implement the method as recited in claim 11.

* * * * *